United States Patent
Crowley et al.

[11] Patent Number: 5,809,620
[45] Date of Patent: Sep. 22, 1998

[54] PALLET STRAP AND METHOD OF OPERATION

[75] Inventors: Robert O. Crowley; Howard N. Stewart, both of Tucson, Ariz.

[73] Assignee: AGM Container Controls, Inc., Tucson, Ariz.

[21] Appl. No.: 900,725

[22] Filed: Jul. 25, 1997

[51] Int. Cl.$^6$ .................................................. A44B 21/00
[52] U.S. Cl. .................. 24/302; 24/68 CD; 24/265 CD; 24/298
[58] Field of Search .............................. 24/302, 301, 300, 24/298, 68 CD, 265 CD; 410/117, 105, 107, 110

[56] References Cited

U.S. PATENT DOCUMENTS

| 2,442,266 | 5/1948 | Davis | 24/68 CD |
|---|---|---|---|
| 2,679,670 | 6/1954 | Griswold | 24/68 CD |
| 3,328,064 | 6/1967 | Simon | 24/298 |
| 4,315,350 | 2/1982 | Looker et al. | 24/68 CD |
| 5,423,644 | 6/1995 | First, Sr. | 24/68 CD |

FOREIGN PATENT DOCUMENTS

| 1297146 | 11/1972 | United Kingdom | 24/68 CD |

*Primary Examiner*—Victor N. Sakran
*Attorney, Agent, or Firm*—Antonio R. Durando

[57] ABSTRACT

An article for securing a load on a pallet includes two reusable straps. A hook is mounted at one end of each strap and is designed to be hooked around the runner of a pallet. The article further includes a quick-release mechanism for connecting the straps to one another. The mechanism comprises a buckle, and a yoke pivotally mounted at one end of the buckle. One of the straps is anchored to the yoke at the end of the strap remote from the respective hook. This strap may be anchored to the yoke permanently or by way of a quick-disconnect device. The buckle and the yoke have a relative position in which the second strap can be threaded into the buckle and then pulled to tighten the straps around a load. Relative pivotal movement of the buckle and the yoke to a second relative position locks the second strap to maintain tension in the straps.

16 Claims, 4 Drawing Sheets

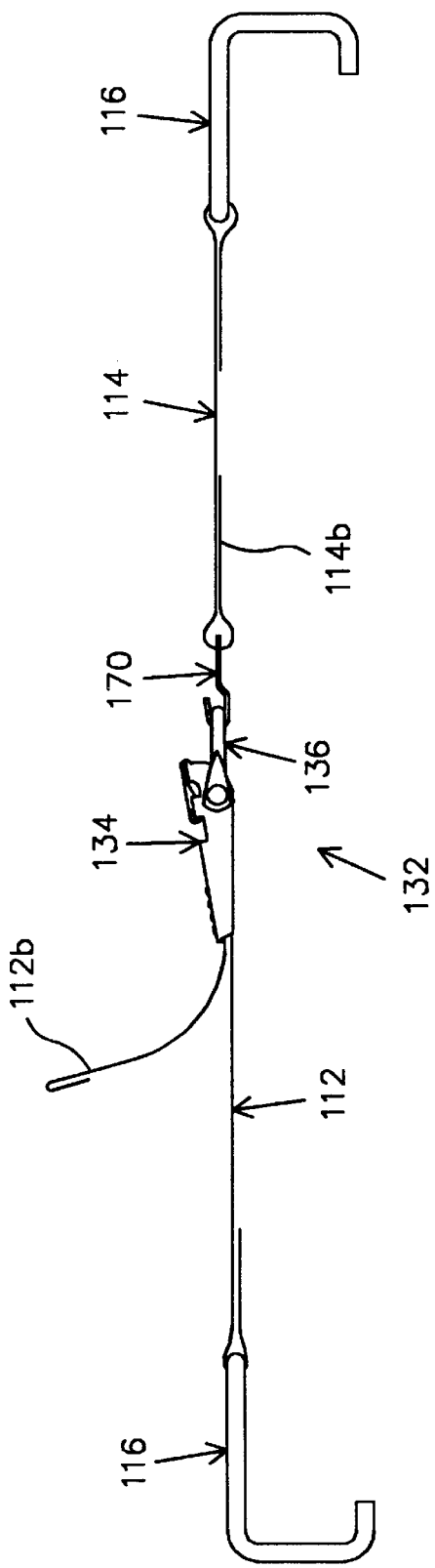
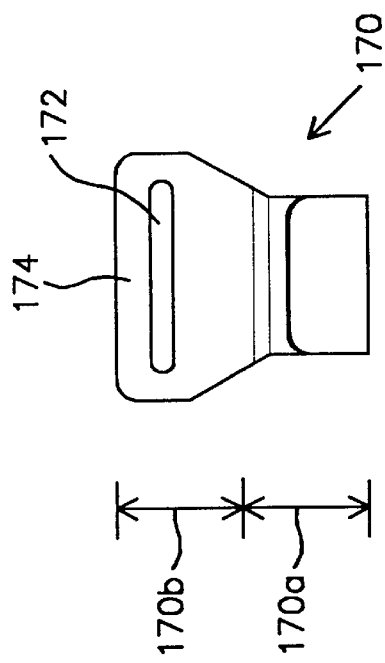

PALLET STRAP AND METHOD OF OPERATION

BACKGROUND OF THE INVENTION

1. Field of the Invention

The invention relates to the securement of a load on a pallet.

2. Description of the Prior Art

Two methods are commonly used to secure a load on a pallet. One method involves tying down the load with plastic or metal bands. The second method is carried out by encasing the load in shrink wrap.

To release the load, scissors are used to cut the bands while a utility knife is employed to cut the shrink wrap. This can result in injuries such as cut fingers. Moreover, the bands or shrink wrap cannot be reused which not only leads to high material costs but requires an expensive waste disposal system.

SUMMARY OF THE INVENTION

It is an object of the invention to provide an article and method which allow the likelihood of injury to be reduced during release of a load on a pallet.

Another object of the invention is to provide an article and method which make it possible to decrease the costs associated with the handling of loads on pallets.

The preceding objects, as well as other which will become apparent as the description proceeds, are achieved by the invention.

An aspect of the invention resides in an article for securing a load on a pallet. The article comprises at least one elongated element, e.g., a strap, designed to at least partly surround the load, and an anchoring element connectible to the elongated element and designed to be anchored to a selected portion of the pallet.

According to one embodiment, the article further comprises quick-release locking means for holding the elongated element under tension.

The quick-release locking means permits the load to be released without having to cut the elongated element. Since no cutting implement is required to release the load, the risk of injury can be reduced. Moreover, this enables the elongated element to be reused.

In accordance with another embodiment, the anchoring element has an anchoring portion which is at least approximately complementary to a selected portion of the pallet and is designed to be releasably anchored to such portion.

Inasmuch as the anchoring element can be releasably anchored to the pallet, the elongated element can be removed from the load without cutting the elongated element. This makes it possible to reuse the elongated element and to reduce the likelihood of injury upon removal of the elongated element.

Another aspect of the invention resides in a method of operating with a load on a pallet. According to the method, the load is at least partly surrounded by an elongated element.

In one embodiment of the method, the elongated element is placed under tension to secure the load on the pallet and the elongated element is subsequently untensioned by quick-release of the tension. The untensioning step is performed without cutting the elongated element.

The elongated element may be provided with an anchoring element having an anchoring portion which is at least approximately complementary to a selected portion of the pallet. In another embodiment of the method, these two portions are coupled, the elongated element is placed under tension to secure the load on the pallet, the elongated element is untensioned, and the anchoring portion and selected portion are uncoupled.

In either embodiment of the method, the elongated element can be reused.

Both embodiments of the method can further comprise the steps of connecting the first elongated element to a second elongated element; at least partly surrounding the load with the second elongated element; placing the second elongated element under tension together with the first elongated element; untensioning the second elongated element together with the first elongated element; and separating the elongated elements from one another by quick-disconnect of the elongated elements.

Additional features and advantages of the invention will be forthcoming from the following detailed description of preferred embodiments when read in conjunction with the accompanying drawings.

BRIEF DESCRIPTION OF THE DRAWINGS

FIG. 5 is a schematic side view of another embodiment of an article in accordance with the invention for securing a load on a pallet.

FIG. 6 is a plan view of a component of the article of FIG. 4.

DESCRIPTION OF THE PREFERRED EMBODIMENTS

Figure 1:
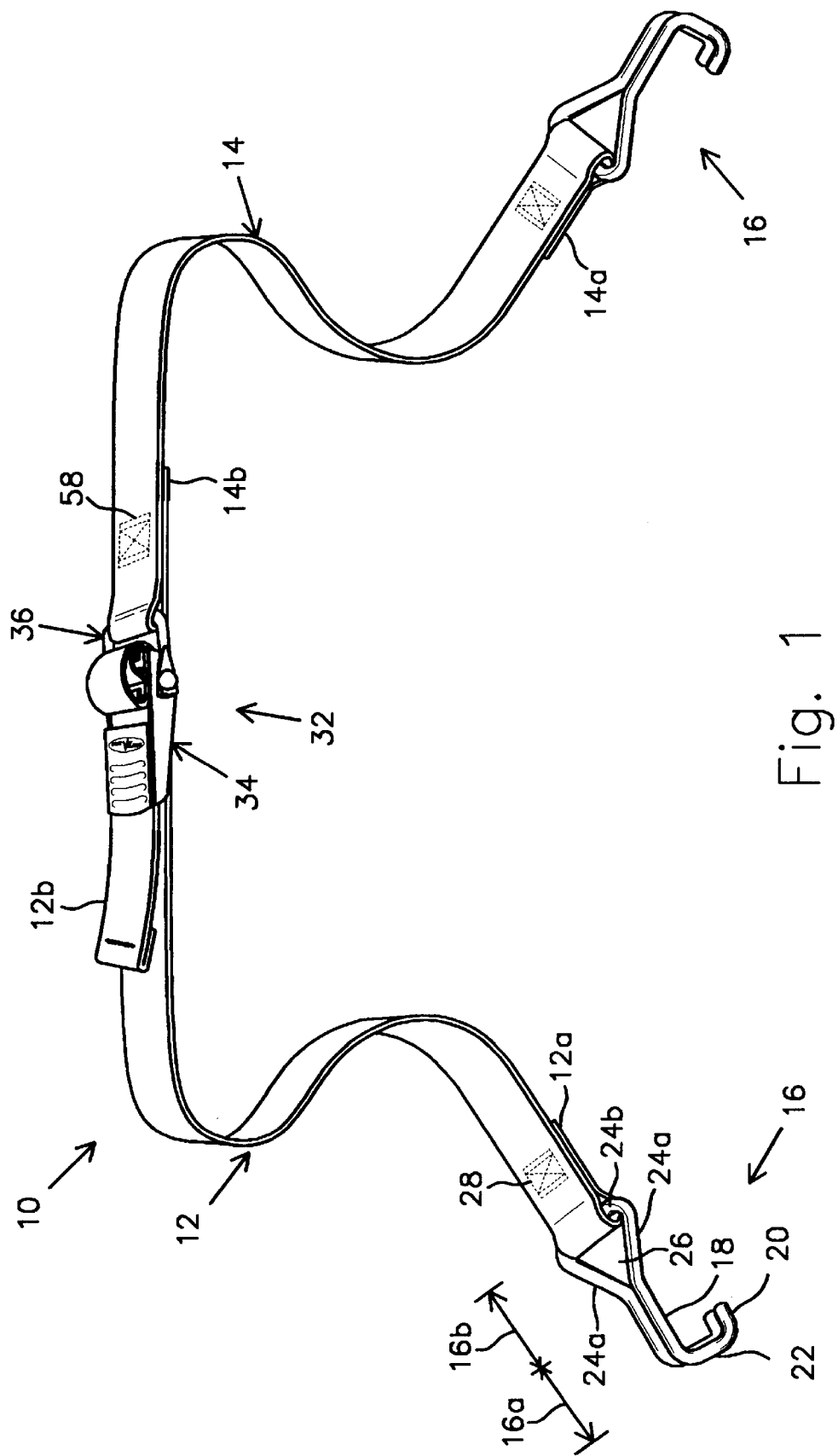
FIG. 1 is a perspective view of one embodiment of an article according to the invention for securing a load on a pallet.

Referring to FIG. 1, an article according to the invention for securing a load on a pallet is identified by the numeral 10. The securing article 10 includes a strap or elongated element 12 having opposite longitudinal ends 12a and 12b. The securing article 10 further includes a second strap or elongated element 14 having opposite longitudinal ends 14a and 14b.

The end 12a of the strap 12 is attached to an anchor or anchoring element 16 which comprises an anchoring portion or section 16a and an attachment portion or section 16b. The anchoring portion 16a is hook-like and includes a pair of coplanar parallel legs 18 as well as a second pair of coplanar parallel legs 20. The legs 18 are longer than and spaced from the legs 20, and each of the legs 18 is connected to a respective leg 20 by a crosspiece or bridging element 22. The crosspieces 22 are coplanar and parallel.

Each of the legs 18 has an end remote from the crosspieces 22. The attachment portion 16b of the anchor 16 is triangular and has two sides 24a which diverge from these ends of the respective legs 18. The attachment portion 16b has a third side 24b which is perpendicular to the legs 18 and extends between the sides 24a.

The junctures of the legs 18 and crosspieces 22, as well as the junctures of the legs 20 and the crosspieces 22, are rounded. The same is true for the junctures of the legs 18 and sides 24a, and the junctures of the sides 24a and side 24b.

The anchor 16 may, for example, be made of wire or rod. Although wire of circular cross section and ¼" diameter is currently preferred for the anchor 16, different cross sections and sizes can be used as can material other than wire. The anchor 16 can be integral and may consist of metal, e.g., steel.

The attachment portion 16b of the anchor 16 defines an opening 26, and the end 12a of the strap 12 passes through the opening 26 and around the side 24b of the attachment portion 16b. By virtue of this design, the end 12a is provided with a looped segment which encircles the side 24b and a layered segment consisting of two superimposed layers of the material of the strap 12. The layers are joined to one another by stitching 28 which establishes a connection between the end 12a and the anchor 16.

The end 14a of the second strap 14 is attached to a second anchor 16 in the same manner as the end 12a of the strap 12 is attached to the first anchor 16.

Figure 2:
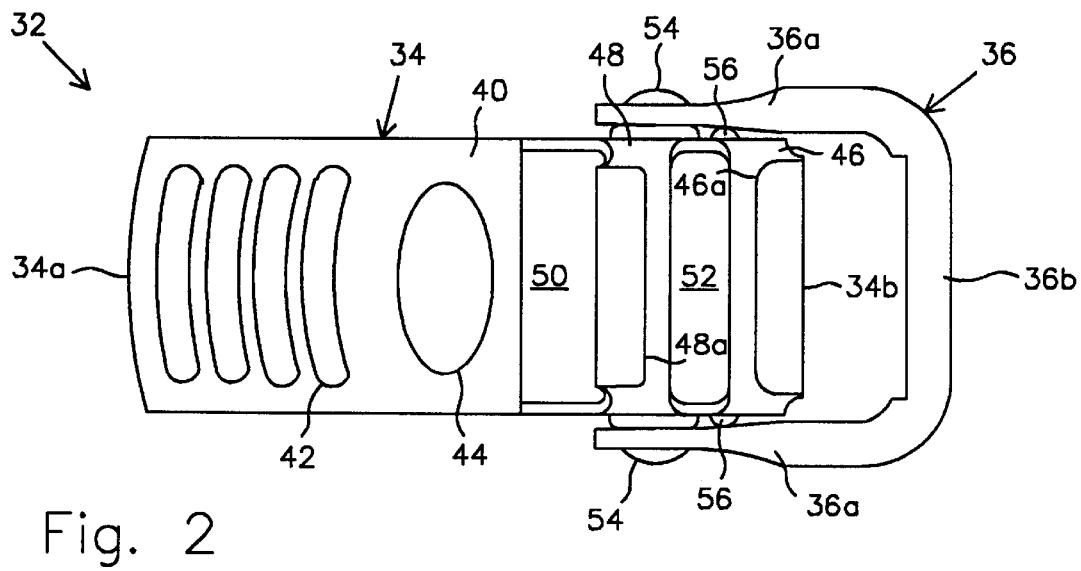
FIG. 2 is a plan view of a component of the article of FIG. 1.
Figure 3:
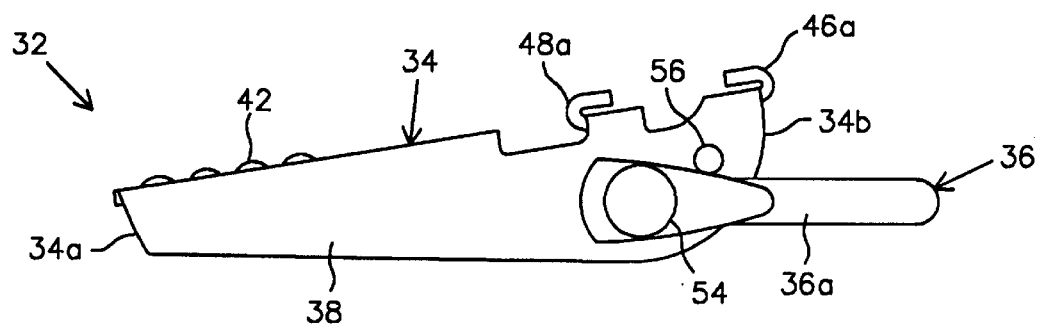
FIG. 3 is a side view of the component of FIG. 2.

Considering FIGS. 2 and 3 in conjunction with FIG. 1, the securing article 10 additionally includes a device 32 for locking and releasing the strap 12. The locking and releasing device 32 comprises a buckle or buckle-like element 34 and a yoke or holding element 36.

The buckle 34 is elongated and has opposite longitudinal ends 34a and 34b. The buckle 34 has a U-shaped cross section and includes a pair of legs 38 (only one leg 38 visible in the drawings) which run the length of the buckle 34. A web 40 bridges the upper edges, as seen in FIGS. 1 and 3, of the legs 38. The surface of the web 40 facing away from the legs 38 is formed with a series of curved ridges 42, and an ellipse 44 is inscribed in the surface. A legend, logo or other information can be placed inside the ellipse 44.

The web 40 extends from the end 34a of the buckle 34 partway to the end 34b. At the end 34b, a second web 46 narrower than the web 40 bridges the upper edges of the legs 38. A lip 46a extends from the edge of the web 46 remote from the web 40 and is bent so as to overlap the web 46.

The webs 40,46 are spaced from one another by a gap, and a relatively narrow third web 48 is located in the gap. The web 48 once again bridges the upper edges of the legs 38. A lip 48a extends from the edge of the web 48 facing the web 40 and is bent so as to overlap the web 48.

The web 48 is spaced from both the web 40 and the web 46. The web 48 cooperates with the web 40 to define a slot 50 in the buckle 34 and with the web 46 to define a slot 52.

The yoke 36 of the locking and releasing device 32 is U-shaped and has a pair of legs 36a which are connected to one another by a crosspiece 36b. The end of each leg 36a remote from the crosspiece 36b is located to the outside of and adjacent a respective leg 38 of the buckle 34, and these ends of the legs 36a are connected to the legs 38 by pivots 54. Thus, the buckle 34 and yoke 36 can pivot clockwise and counterclockwise relative to one another as seen in FIGS. 1 and 3. The pivots 54 are disposed nearer the end 34b than the end 34a of the buckle 34.

The outer surf ace of each leg 38 is provided with a circular protrusion 56 between the respective pivot 54 and the end 34b of the buckle 34. The protrusions 56 are designed to contact the legs 36a of the yoke 36 and to offer frictional resistance to pivoting of the buckle 34 and the yoke 36 between their extreme relative positions.

As illustrated in FIG. 1, the end 14b of the strap 14 passes between the buckle 34 and the crosspiece 36b of the yoke 36 and around the crosspiece 36b. By virtue of this design, the end 14b is provided with a looped segment which encircles the crosspiece 36b and a layered segment consisting of two superimposed layers of the material of the strap 14. The layers are joined to one another by stitching 58 which establishes a connection between the end 14b and the locking and releasing device 32.

In use, the end 12b of the strap 12 is threaded through the slots 50,52 of the buckle 34 and passed beneath the web 40 so that the strap end 12b protrudes from the end 36a of the buckle 34. This is shown in FIG. 1. When the buckle 34 and the yoke 36 are in the relative position of FIG. 1, the strap 12 is locked by the locking and releasing device 32, i.e., the strap 12 is unable to shift relative to the buckle 34. By lifting the strap end 12b and thereby pivoting the buckle 34 relative to the yoke 36, the buckle 34 and yoke 36 assume a new relative position in which the strap 12 is released. Since the strap 12 can be released rapidly by simply pivoting the buckle 34 and yoke 36 relative to each other, the locking and releasing device 32 constitutes a quick-release mechanism. The locking and releasing device 32 is of a type referred to as an over-center device.

The buckle 34 and yoke 36 may be made of metal, e.g., steel. The straps 12,14 preferably consist of a textile and can, for instance, be constituted by bulked nylon webbing or polypropylene webbing. The straps 12,14 are designed to be reusable.

Figure 4:
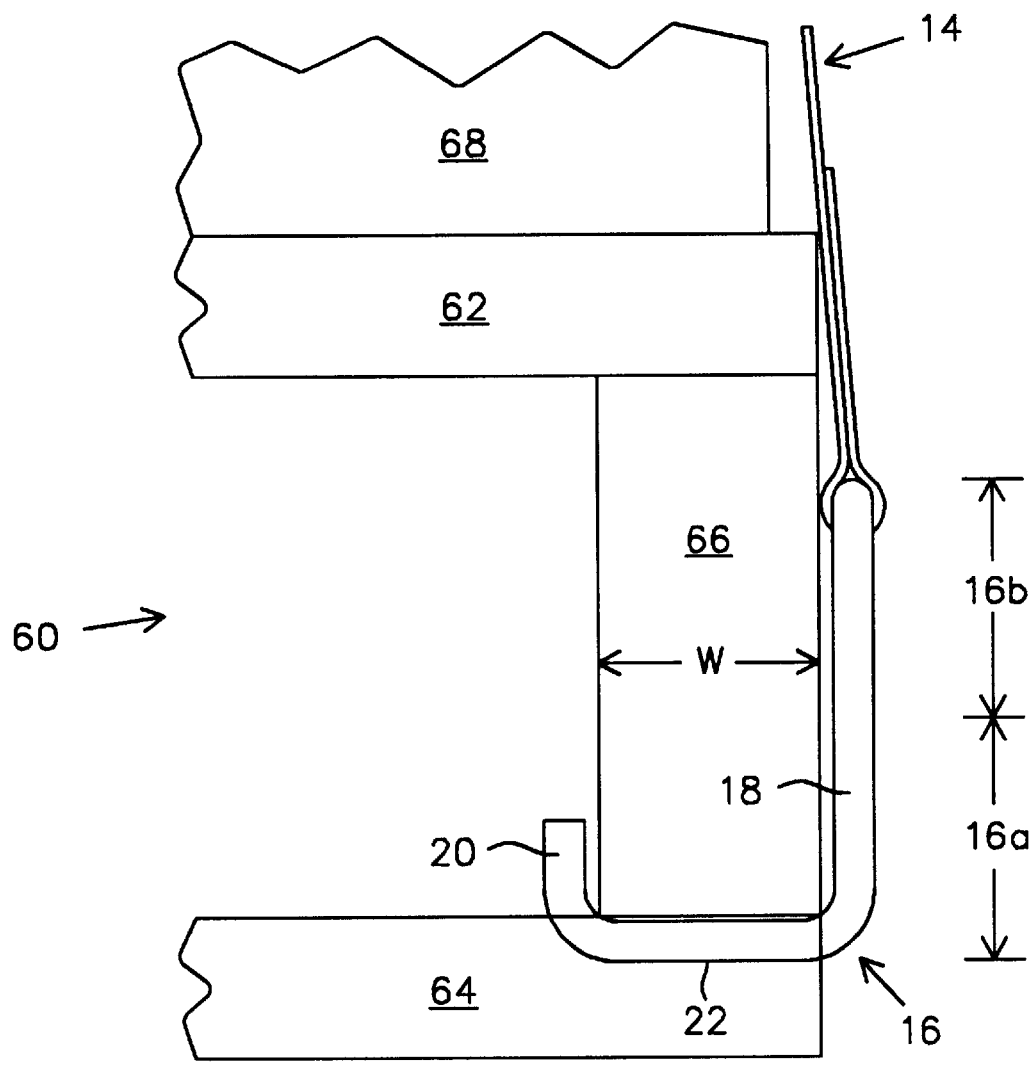
FIG. 4 is a schematic fragmentary view showing the article of FIG. 1 securing a load to a pallet.

FIG. 4 illustrates a pallet 60 having a series of top boards, a series of bottom boards and a series of standard 2×4 runners between the top and bottom boards. Only one of the top boards, one of the bottom boards and one of the runners is visible, and these are denoted by 62, 64 and 66, respectively. A load 68 rests on the top boards.

The anchor 16 of the strap 12 engages the runner 66 from below with the anchoring portion 16a of the anchor 16 receiving the runner 66. The anchoring portion 16a is approximately complementary to the runner 66. Thus, the runner 66 has a rectangular outline in the view of FIG. 4, and the legs 18,20 of the anchoring portion 16a, together with the crosspieces 22, define a receiving space of approximately rectangular outline for the bottom part of the runner 66. Furthermore, the runner 66 has a width W as seen in FIG. 4, and the distance between the legs 18 and the legs 20 of the anchoring portion 16a is approximately equal to the width W. In particular, the distance between the legs 18 and the legs 20 is slightly greater than the width W and is selected so that the bottom part of the runner 66 fits snugly in the receiving space of the anchoring portion 16a. The standard 2×4 runner 66 has a width W of 1.5 inch and the distance between the legs 18 and the legs 20 can, by way of example, be 1.56 inch.

The operation of the securing article 10 is as follows:

Assuming that the strap 12 has been threaded into the buckle 34, the locking and releasing device 32 is placed on top of or alongside the load 68. The locking and releasing device 32 is in its released condition to permit adjustment of the strap 12. The straps 12,14 are passed down opposite sides of the load 68, and the strap 12 is adjusted, if necessary, to position the anchors 16 of the straps 12,14 at or near the level of the bottom boards of the pallet 60.

The anchor 16 of the strap 12 is hooked around the runner 66 as shown in FIG. 4 whereas the anchor 16 of the strap 14 is hooked around a runner on the other side of the pallet 60. The anchors 16 are preferably positioned directly opposite one another. If the runners of the pallet 60 are notched, the anchors 16 can be held in, or approximately in, the upright position of FIG. 4 while the legs 20 are passed through respective notches of the runners so as to allow the anchors 16 to be hooked around the runners. For unnotched runners, the anchors 16 are turned on their sides and the legs 20 are slipped underneath the respective runners between the bottom board 64 and a neighboring bottom board. Once the legs 20 have passed by the runners, the anchors 16 are turned upright and hooked around the runners.

After the anchors 16 have been hooked around the associated runners, the end 12b of the strap 12 is pulled to tighten and tension the straps 12,14.

In the released condition of the locking and releasing device 32, the end 34a of the buckle 34 is pivoted away from the load 68. Once the straps 12,14 have the desired tension, the end 34a is pressed to thereby pivot the latter towards the load 68. This action brings the locking and releasing device 32 into its locked condition and arrests the strap 12 with the straps 12,14 under tension.

When the pallet 60 has been transported to its desired location, the end 12b of the strap 12 is pulled away from the load 68. As the end 12b is pulled away from the load 68, the end 12b pivots the end 34a of the buckle 34 away from the load 68. Consequently, the locking and releasing device 32 is brought into its released condition and the tension in the straps 12,14 is removed. The anchors 16 are unhooked from the respective runners and the securing article 10 is used for another load.

The method of operation just described is exemplary and variations are possible. For example, the anchors 16 can be hooked around the respective runners before the strap 12 is threaded into the buckle 34.

Turning to FIG. 5, the same numerals as in FIGS. 1–3, plus 100, are used to identify similar elements.

FIG. 5 illustrates a securing article 110 which differs from the securing article 10 of FIG. 1 in the presence of a coupling element 170 which serves as a quick-disconnect device for the straps 112,114. Considering FIG. 6 in conjunction with FIG. 5, the coupling element 170 includes a hook-like anchoring portion 170a and a flat attachment portion 170b. The anchoring portion 170a is designed to hook around and receive the crosspiece 136b of the yoke 136.

The attachment portion 170b of the coupling element 170 is provided with a slot 172 which is located at the end of the attachment portion 170b remote from the anchoring portion 170a. On the side remote from the anchoring portion 170a, the slot 172 is bounded by a fillet 174.

The slot 172 is dimensioned to permit passage of the strap 114 therethrough. As illustrated in FIG. 5, the end 114b of the strap 114 passes through the slot 172 and around the fillet 174. By virtue of this design, the end 114b is provided with a looped segment which encircles the fillet 174 and a layered segment consisting of two superimposed layers of the material of the strap 114. The layers are joined to one another by stitching which establishes a connection between the end 114b and the coupling element 170.

The securing article 110 operates in the same manner as the securing article 10. However, in contrast to the straps 12,14 of the article 10, the straps 112,114 of the article 110 can be rapidly separated from each other by slipping the crosspiece 136b of the yoke 136 out of anchoring portion 170a of the coupling element 170. The straps 112,114 can be reconnected equally rapidly by reinserting the crosspiece 136b in the anchoring portion 170a.

The securing articles 10,110 may be used for in-plant, interplant and closed-loop systems.

The securing articles 10,110 may be reused hundreds, if not thousands, of times. Since the securing articles 10,110 are reusable, they are more environmentally friendly than shrink wrap and disposable bands which must be discarded after use. Moreover, the reusable articles 10,110 allow material costs to be reduced and eliminate the need for expensive waste disposal systems such as are required for shrink wrap and disposable bands. Disposable bands cannot always be recycled, and such bands may not only be difficult to dispose of but can also present a danger of injury.

The securing articles 10,110 can also save time. Thus, they are easy to install, simple to adjust and quick to release. Furthermore, the securing articles 10,110 are easier and quicker to use than shrink wrap or disposable bands. It is possible to secure a load in a minute or less and to remove the securing articles 10,110 from a load in one-half minute or less. The positive lock-in tensioning achievable with the securing articles 10,110 further increases the time which can be saved.

The securing articles 10,110 can also be retightened if they develop slack. This is not possible with shrink wrap and disposable bands.

Additionally, the securing articles 10,110 are safer than shrink wrap and disposable bands which respectively require a utility knife and scissors for their removal. Inasmuch as the securing articles 10,110 are removable without a utility knife or scissors, the risk of injury during removal of the securing articles 10,110 is greatly reduced.

The securing articles 10,110 can be designed so that they protrude very little to the outside of the runners. This enables the same number of pallets to be loaded as with shrink wrap or disposable bands.

With appropriate construction of the securing articles 10,110, little or no damage occurs to the runners. Moreover, unlike disposable bands, no tooling is required to tighten the securing articles 10,110. Since such tooling is available only at certain locations, the securing articles 10,110 are far more versatile than disposable bands. Furthermore, the operation of the securing articles 10,110 is largely unaffected by sand, mud, ice or saltwater.

Information such as, for instance, tightening, loosening and threading instructions, can be sewn onto one or both of the straps 12,14 as well as one or both of the straps 112,114.

Various modifications are possible within the meaning and range of equivalence of the appended claims.

We claim:

1. An article for securing a load on a pallet comprising:
   at least one elongated element designed to at least partly surround the load;
   an anchoring element connectible to said one elongated element and designed to be anchored to a selected portion of the pallet; and
   quick-release locking means for holding said one elongated element under tension;
   wherein said locking means comprises a buckle-like element having at least one slot dimensioned to permit passage of said one elongated element therethrough and a holding element for an additional elongated element, said buckle-like element and said holding element being connected to one another for movement between a first relative position in which said one elongated element is locked and a second relative position in which said one elongated element is released.

2. The article of claim 1, wherein said one elongated element comprises a textile band.

3. The article of claim 1, wherein said anchoring element comprises an anchoring portion which is at least approximately complementary, and is designed to be releasably anchored, to the selected portion of the pallet.

4. The article of claim 1, wherein said anchoring element comprises a hook-like anchoring portion designed to be anchored to the selected portion of the pallet.

5. The article of claim 4 for use with a pallet having a runner which is of predetermined width and includes the selected portion of the pallet, wherein said hook-like portion comprises a pair of at least approximately parallel legs, and a crosspiece bridging said legs, said legs being spaced by a distance in excess of the predetermined runner width.

6. The article of claim 5, wherein said distance approximates the predetermined runner width.

7. The article of claim 6, wherein the predetermined runner width and said distance are approximately 1.5 inches.

8. The article of claim 1, further comprising quick-disconnect means for connecting said one elongated element and the additional elongated element to one another, said quick-disconnect means including a coupling element connectible to the additional elongated element and to said holding element.

9. The article of claim 8, wherein said coupling element comprises a hook-like coupling portion and said holding element comprises another portion receivable by said hook-like portion.

10. An article for securing a load on a pallet comprising:
    at least one elongated element designed to at least partly surround the load;
    an anchoring element connectible to said elongated element, said anchoring element having an anchoring portion which is at least approximately complementary, and is designed to be releasably anchored, to a selected portion of the pallet; and
    quick-release locking means for holding said one elongated element under tension, said locking means including a buckle-like element having at least one slot dimensioned to permit passage of said one elongated element therethrough and a holding element for an additional elongated element, said buckle-like element and said holding element being connected to one another for movement between a first relative position in which said one elongated element is locked and a second relative position in which said one elongated element is released.

11. The article of claim 10, wherein said anchoring portion is hook-like.

12. The article of claim 11 for use with a pallet having a runner of predetermined width which includes the selected portion of the pallet, wherein said anchoring portion comprises a pair of at least approximately parallel legs, and a crosspiece bridging said legs, said legs being spaced by a distance which at least approximates the predetermined runner width.

13. The article of claim 12, wherein the predetermined runner width and said distance are approximately 1.5 inches.

14. The article of claim 10, further comprising quick-disconnect means for connecting said one elongated element to the additional elongated element, said quick-disconnect means comprising a coupling element connectible to the additional elongated element and to said holding element.

15. The article of claim 14, wherein said coupling element comprises a hook-like portion and said holding element comprises another portion receivable by said hook-like portion.

16. The article of claim 10, wherein said one elongated element comprises a textile band.

* * * * *